UNITED STATES PATENT OFFICE.

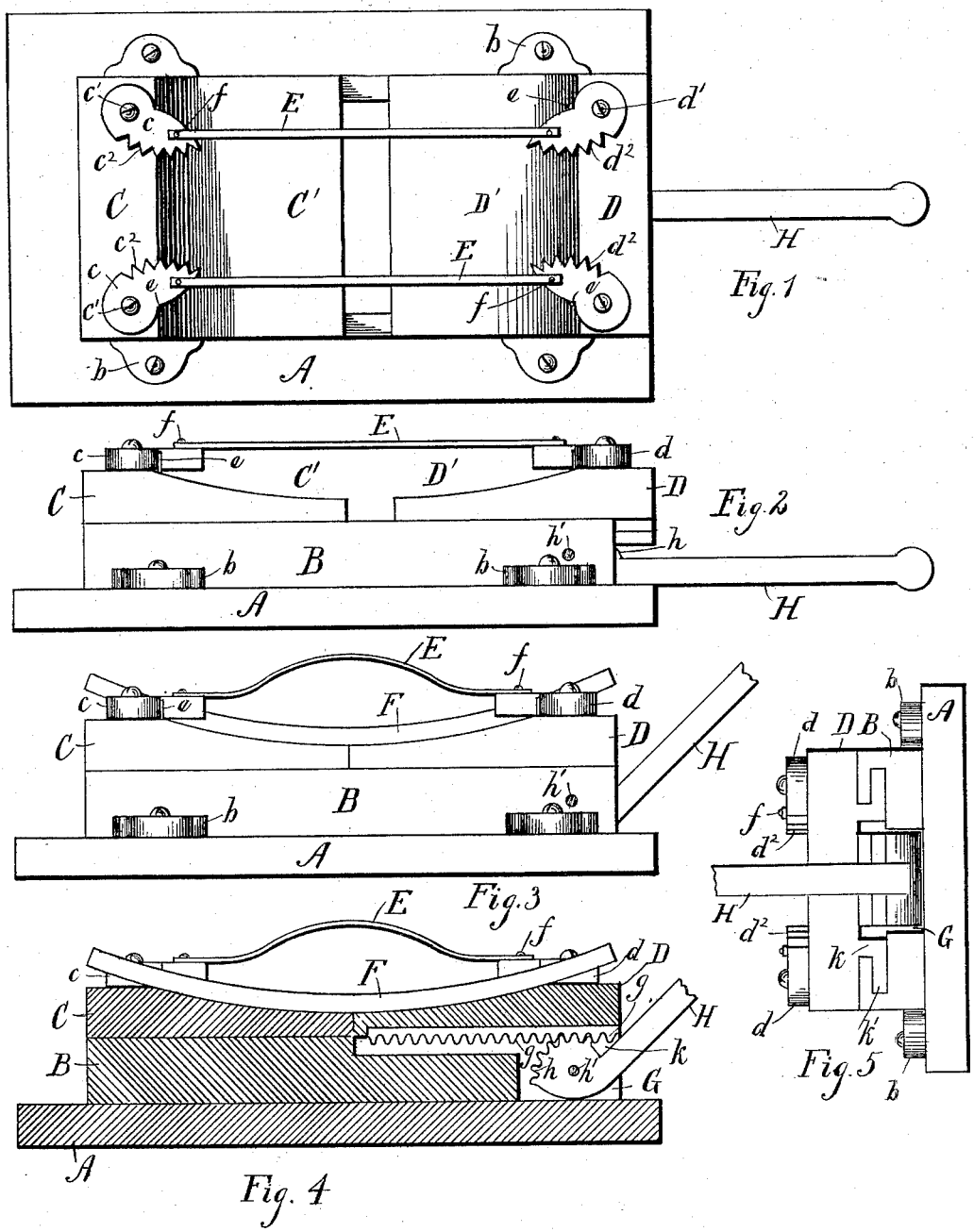

CHARLES M. MOSS, OF LANCASTER, PENNSYLVANIA.

TIRE-SHRINKER.

SPECIFICATION forming part of Letters Patent No. 430,872, dated June 24, 1890.

Application filed December 23, 1889. Serial No. 334,786. (No model.)

*To all whom it may concern:*

Be it known that I, CHARLES M. MOSS, a citizen of the United States, residing in Lancaster, in the county of Lancaster and State of Pennsylvania, have invented certain Improvements in Tire-Shrinkers, of which the following is a specification.

This invention relates to improvements in machines for shrinking or upsetting tires; and it consists in the construction and operation of parts, as hereinafter fully described, and specifically set forth in the claims.

In the accompanying drawings, which form a part of this specification, Figure 1 is a top or plan view of a tire-shrinker embodying my invention, showing the beds in a position to receive a tire; and Fig. 2 is a side view of the same. Fig. 3 is a side view showing the movable bed closed upon the stationary bed and a tire in place on the beds, and Fig. 4 is a longitudinal vertical section of the same. Fig. 5 is an elevation of the end of the machine at which the operating-lever is placed.

Similar letters indicate like parts throughout the several views.

Referring to the details of the drawings, A indicates the table or platform upon which the shrinker is placed, B the base upon and within which the operating mechanism is located, and C the stationary bed secured to the top and one at end of the base. The base is provided with perforated lugs $b$ at its lower edges, by which it is secured to the platform A, and at one end there is a recess G formed in it of the entire depth thereof, and the upper portion of this recess extends forward to the stationary bed C, as shown in Fig. 4.

Upon the base and over the recess G and its forward extension is placed a movable bed D. Ribs $k$, having tongues $k'$, are formed on the under side of the bed D and extend down into and bear against the sides of the recess G, the tongues $k$, engaging in grooves in the sides of the said recess, serving to guide the bed D in its forward and backward movements on the base B. On the bottom of the bed D, midway between the ribs $k$, there is a rack $g$ attached, which extends lengthwise of the bed, as shown in Fig. 4. In the rear end of the recess G and beneath the rack $g$ there is a lever H, pivoted on a fulcrum-pin $h'$. The part of the lever through which the pin $h'$ passes is circular in form, and has a pinion $h$ formed on its periphery, which meshes with the rack $g$, and through which motion is imparted to the bed D. The beds C and D are curved on top at their inner ends, so as to form a concave surface when the two are brought together, the outer ends being flat, as shown in Figs. 2, 3, and 4.

On each side of the flattened end of the bed C there is a dog $c$, pivoted at $c'$, the cam-shaped ends of which are provided on their inner faces with horizontal teeth $c^2$, and on each side of the flattened end of the bed D there is a similar dog $d$, pivoted at $d'$ and having teeth $d^2$. The oscillating ends of the dogs $c$ $d$ on the same side of the beds C D are connected by bars E, of spring metal, pivoted to the dogs at $f$. The dogs are so mounted on the beds that the teeth thereof are at all times faced toward the center line of the shrinker, and they are prevented from being turned outward too much when the beds are separated by pins $e$ driven into the beds. When the beds C and D are in position to receive a tire to be shrunken, the points of greatest eccentricity of the dogs $c$ $d$ point toward the center of the shrinker, and the spring-bars E are fastened to the dogs inside of the pivots about which the dogs work, so that as soon as the movement of the bed D toward the bed C begins the dogs are automatically closed upon any tire resting on the shrinker. Normally the beds C and D are held apart by the springs E, the lever H being depressed, as shown in Fig. 2.

In operating a tire F is placed on the beds between the dogs $c$ $c$ and $d$ $d$, and the lever is then raised, acting through the rack and pinion to force the bed D toward the bed C. The movement of the bed D causes the dogs to grip the sides of the tire, the cam ends of the dogs being shaped to enable them to take firm hold of tires of any width. On removing the upward pressure from the lever the springs E throw the dogs out of engagement with the tire and force the bed D back to its normal position.

As will be observed, the whole construction of my tire-shrinker is exceedingly simple, resulting in a cheap, compact, and efficient machine, which can be readily operated.

Having thus described my invention, what I claim as new, and desire to secure by Letters Patent, is—

1. In a tire-shrinker, the combination, with beds adapted to be closed together, of dogs pivoted on said beds, a spring-bar secured to opposite dogs on the two beds and adapted to disengage said dogs from a tire on the beds, and a device for closing the beds together, substantially as and for the purpose specified.

2. In a tire-shrinker, the combination, with beds adapted to be closed together, of dogs pivoted on said beds, a spring-bar pivoted to opposite dogs on the two beds inside of the pivots about which the dogs revolve, and a device for forcing the beds together, substantially as and for the purpose specified.

3. In a tire-shrinker, the combination, with beds adapted to be closed together, of dogs pivoted on said beds, a spring-bar pivoted to opposite dogs on the two beds inside of the pivots about which the dogs revolve, pins, as $e$, adapted to limit the outward revolution of the dogs, and a device for closing the dogs together, substantially as and for the purpose specified.

4. In a tire-shrinker, the combination, with the base B, having a bed C rigidly secured on one end and a recess G formed in the other, of a bed D, movably secured over the recess and provided with a rack on its under side, a lever secured by a fulcrum-pin beneath the rack and having a pinion adapted to mesh with said racks, dogs pivoted on both sides of the two beds, and springs connecting the dogs on the two beds and constructed to force the bed D away from the bed C and disengage the dogs from the tire, substantially as specified.

CHARLES M. MOSS.

Witnesses:
JACOB HALBACH,
WM. R. GERHART.